(12) United States Patent
Nagafuku et al.

(10) Patent No.: US 6,561,407 B2
(45) Date of Patent: May 13, 2003

(54) REFLOW SOLDERING APPARATUS AND METHOD

(75) Inventors: Nobuyasu Nagafuku, Kofu (JP); Akihiko Wachi, Yamanashi-ken (JP); Masaya Matsumoto, Kofu (JP); Toshiyuki Koyama, Yamanashi-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/054,882

(22) Filed: Jan. 25, 2002

(65) Prior Publication Data

US 2002/0060235 A1 May 23, 2002

Related U.S. Application Data

(62) Division of application No. 09/671,111, filed on Sep. 28, 2000, now Pat. No. 6,382,497.

(30) Foreign Application Priority Data

Sep. 30, 1999 (JP) .............................................. 11-278948

(51) Int. Cl.[7] .............................................. B23Q 15/013
(52) U.S. Cl. ...................................................... 228/10
(58) Field of Search ................................. 228/102, 103, 228/180.22, 180.21, 8, 9, 10, 11; 219/388; 432/52, 53

(56) References Cited

U.S. PATENT DOCUMENTS

| 4,775,776 | A | * | 10/1988 | Rahn et al. ................. 219/388 |
| 4,997,364 | A | * | 3/1991 | McGrath et al. ............... 432/59 |
| 5,758,817 | A | * | 6/1998 | Chapman .................... 228/264 |
| 5,836,504 | A | * | 11/1998 | Koike et al. ................. 228/103 |
| 6,170,647 | B1 | * | 1/2001 | Miura ........................ 198/833 |

FOREIGN PATENT DOCUMENTS

JP          4-356352          12/1992

* cited by examiner

Primary Examiner—Tom Dunn
Assistant Examiner—Jonathan Johnson
(74) Attorney, Agent, or Firm—Wenderoth, Lind & Ponack, L.L.P.

(57) ABSTRACT

The present invention provides an apparatus and a method for operating reflow soldering in a mounting field whereby an abnormality in transfer of circuit boards can be detected with high reliability. Whether or not a circuit board is transferred by a transfer conveyor is judged. A discharge conveyor is started when a control device judges occurrence of transfer abnormality. After the discharge conveyor starts, the transfer abnormality is determined to be a drop of the circuit board if a discharge completion detector detects that a dropped circuit board is discharged. And then the control device continues the reflow soldering. The transfer abnormality in the reflow soldering apparatus can be detected with high reliability because it can be detected whether the transfer abnormality is either the drop or a clog of the circuit board.

8 Claims, 10 Drawing Sheets

<OUTPUT OF SENSOR 111>

REFLOW SOLDERING APPARATUS AND METHOD

This is a divisional application of Ser. No. 09/671,111, filed Sep. 28, 2000 now U.S. Pat. No. 6,382,497.

BACKGROUND OF THE INVENTION

1. Field of the Invention

The present invention relates to a reflow soldering apparatus and a reflow soldering method for soldering electronic components on a circuit board by sending the circuit board with electronic components mounted thereto through a heating furnace.

2. Description of the Related Art

In a reflow soldering apparatus, a circuit board and electronic components are heated, thereby melting a solder to join the circuit board and electronic components by the solder. A high reliability has been demanded recently in judging whether the circuit board is transferred normally or abnormally in the reflow soldering apparatus to prevent overheating of the circuit board and the electronic components during the transfer.

Figure 12:
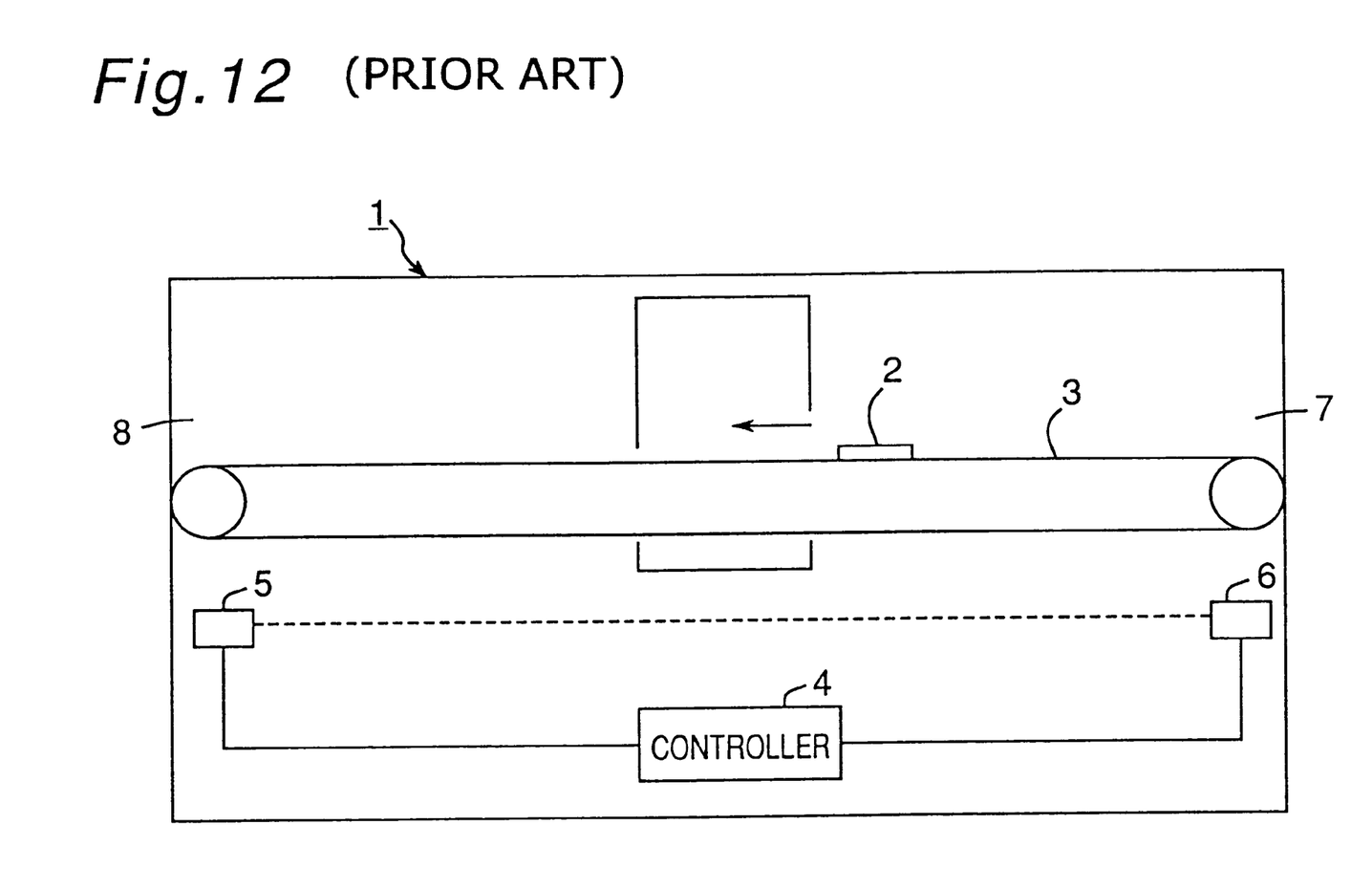
FIG. 12 is a diagram schematically showing the constitution of a conventional reflow soldering apparatus.

A conventional reflow soldering apparatus will be described with reference to FIG. 12. In a conventional reflow soldering apparatus 1 shown in FIG. 12, 2 is a circuit board, 3 is a circuit board transfer conveyor, 4 is a controller, 5 is a reception side of a transmitting type sensor, and 6 is a projection side of the transmitting type sensor. Operation of the reflow soldering apparatus in the constitution will be described below.

The circuit board 2 carried in from an entrance side 7 of the reflow soldering apparatus 1 is transferred to an exit side 8 of the reflow soldering apparatus 1 by the circuit board transfer conveyor 3. If the circuit board drops from the circuit board transfer conveyor 3 while being transferred, the reception side 5 and projection side 6 of the transmitting type sensor detect the dropped circuit board 2, with outputting a signal to the controller 4.

Meanwhile, a publication No. 4-356352 of Unexamined Japanese Patent Application discloses a reflow soldering apparatus which has circuit board-detecting sensors arranged at an entrance and an exit, and circuit board surface temperature-detecting sensors arranged via a constant interval thereinside. It is monitored whether the sensors are turned into an off state within a fixed time after having been an on state in consequence of detecting the circuit board, thereby detecting whether or not the circuit board is caught in the middle of the transfer.

In the above constitution of the reflow soldering apparatus 1 shown in FIG. 12, only the drop of the circuit board 2 is detected and a jam of the circuit board in the middle of the transfer cannot be detected. Also, since the transmitting type sensor is used to detect the drop, the apparatus 1 has a problem that the circuit board 2 that is detectable in the apparatus is limited in terms of a thickness by a light projection width from the transmitting type sensor.

Further the invention disclosed in the published specification No. 4-356352 cannot detect the drop.

SUMMARY OF THE INVENTION

The object of the present invention is therefore to provide a reflow soldering apparatus and a reflow soldering method with which an abnormality in transfer of circuit boards can be detected with high reliability, with solving the above problems.

In order to achieve the aforementioned objective, according to a first mode of the present invention, there is provided a reflow soldering apparatus comprising:

a transfer conveyor for transferring a circuit board with electronic components from an entrance to an exit of the reflow soldering apparatus having a heating furnace through which the circuit board mounted is passed so as to operate reflow soldering to the electronic components on the circuit board;

an exit-side circuit board detect sensor arranged at the exit for detecting that the circuit board transferred by the transfer conveyor is carried into the reflow soldering apparatus;

a discharge conveyor arranged below the transfer conveyor for discharging a dropped circuit board dropped from the transfer conveyor during the transfer by the transfer conveyor from an inside to an outside of the reflow soldering apparatus;

a discharge completion detector arranged at an exit side of the discharge conveyor for detecting that the dropped circuit board transferred by the discharge conveyor is discharged to the outside of the reflow soldering apparatus; and a control device which judges based on information from the exit-side circuit board detect sensor whether or not the circuit board is transferred by the transfer conveyor from the entrance to the exit, controls the discharge conveyor to discharge the dropped circuit board when judging occurrence of transfer abnormality, determines that the transfer abnormality is the drop of the circuit board when the discharge completion detector detects the dropped circuit board, and then continues the reflow soldering when determining the drop.

In an arrangement of the reflow soldering apparatus, in the case where a plurality of circuit boards are carried to the entrance in a single line, the control device may determine that the transfer abnormality is a jam of the circuit boards at the transfer conveyor and then lowering a temperature of the heating furnace when the discharge completion detector does not detect discharge of the dropped circuit board and moreover the exit-side circuit board detect sensor does not detect discharge of the circuit board.

The reflow soldering apparatus may further comprise an entrance-side circuit board detect sensor arranged at the entrance for detecting that the circuit board is carried into the apparatus, wherein the control device has a transfer estimate time necessary for the transfer conveyor to transfer the circuit board from the entrance to the exit, so that the control device judges presence or absence of the transfer abnormality on a basis of whether or not the exit-side circuit board detect sensor detects discharge of the circuit board within a circuit board detect time after the transfer estimate time has passed, the circuit board detect time corresponding to a passing time of the circuit board in a transfer direction of the circuit board detected by the entrance-side circuit board detect sensor.

In the reflow soldering apparatus may further comprise an entrance-side circuit board detect sensor arranged at the entrance for detecting that the circuit board is carried into the apparatus, wherein, in the case where a plurality of circuit boards are carried to the entrance in a single line, the control device judges presence or absence of the transfer abnormality based on a comparison between a carry-in interval of adjacent circuit boards detected by the entrance-side circuit board detect sensor and a discharge interval of the adjacent circuit boards detected by the exit-side circuit board detect sensor.

The reflow soldering apparatus may further comprise an entrance-side circuit board detect sensor arranged at the entrance for detecting that the circuit board is carried into the apparatus, and a counter device in which a circuit board count set value is defined and which adds one when the entrance-side circuit board detect sensor detects the circuit board and subtracts one when the exit-side circuit board detect sensor detects the circuit board, the circuit board count set value corresponding to the number of circuit boards which can be presented between the entrance-side circuit board detect sensor and the exit-side circuit board detect sensor, so that the control device judges presence or absence of the transfer abnormality on a basis of a comparison between the circuit board count set value and a counted circuit board value by the counter device.

Further according to a second mode of the present invention, there is provided a reflow soldering method comprising:

judging whether or not a circuit board with electronic components mounted thereon is transferred by a transfer conveyor from an entrance to an exit of a reflow soldering apparatus with a heating furnace for operating reflow soldering to the electronic components on the circuit board by passing the circuit board through the heating furnace;

detecting, when presence of transfer abnormality is judged, whether or not a dropped circuit board dropped from the transfer conveyor while being transferred by the transfer conveyor is discharged to an outside of the apparatus by a discharge conveyor arranged below the transfer conveyor;

determining, when the dropped circuit board is detected to be discharged by the discharge conveyor, that the transfer abnormality is the drop of the circuit board; and continuing the operation of the reflow soldering.

In the reflow soldering apparatus according to the first mode and the reflow soldering method according to the second mode of the present invention, the transfer conveyor, the exit-side circuit board detect sensor, the discharge conveyor, the discharge completion detector, and the control device are comprised in addition to the heating furnace for soldering. Whether or not the circuit board is transferred by the transfer conveyor is judged, and the discharge conveyor is started when an abnormality in the transfer is judged. After the start of the discharge conveyor, when the discharge completion detector detects that the dropped circuit board is discharged, the transfer abnormality is determined to be the drop of the circuit board and the reflow soldering is continued. Thus it can be detected whether the circuit board transfer abnormality in the reflow soldering apparatus is the drop of the circuit board or the clog of the circuit board. The transfer abnormality is thus detected with high reliability.

Since the heating furnace is decreased in temperature when the circuit board clog is judged, the clogged circuit board is prevented from being excessively raised in temperature.

Further, in the reflow soldering apparatus according to the first mode, since presence or absence of the transfer abnormality is judged on the basis of the transfer estimate time, the transfer abnormality of the circuit board can be detected irrespective of a thickness of the circuit board.

Further, in the reflow soldering apparatus according to the first mode, when the judgment is based on the comparison between the carry-in interval and discharge interval of the circuit boards, the presence or absence of the transfer abnormality can be judged for each transferred circuit board.

Further, in the reflow soldering apparatus according to the first mode, when the presence or absence of the transfer abnormality is judged on the basis of the number of circuit boards being transferred, the transfer abnormality can be detected irrespective of thicknesses of the circuit boards and, whether the transfer abnormality results from the clog or drop in the middle of the transfer of the circuit boards by the transfer conveyor can also be judged.

BRIEF DESCRIPTION OF THE DRAWINGS

These and other objects and features of the present invention will become clear from the following description taken in conjunction with the preferred embodiments thereof with reference to the accompanying drawings in which.

DETAILED DESCRIPTION OF THE PREFERRED EMBODIMENTS

A reflow soldering apparatus and a reflow soldering method carried out by the reflow soldering apparatus of embodiments of the present invention will be described with reference to the drawings. It is to be noted here that like parts are designated by like reference numerals throughout the drawings.

First Embodiment

Figure 1:
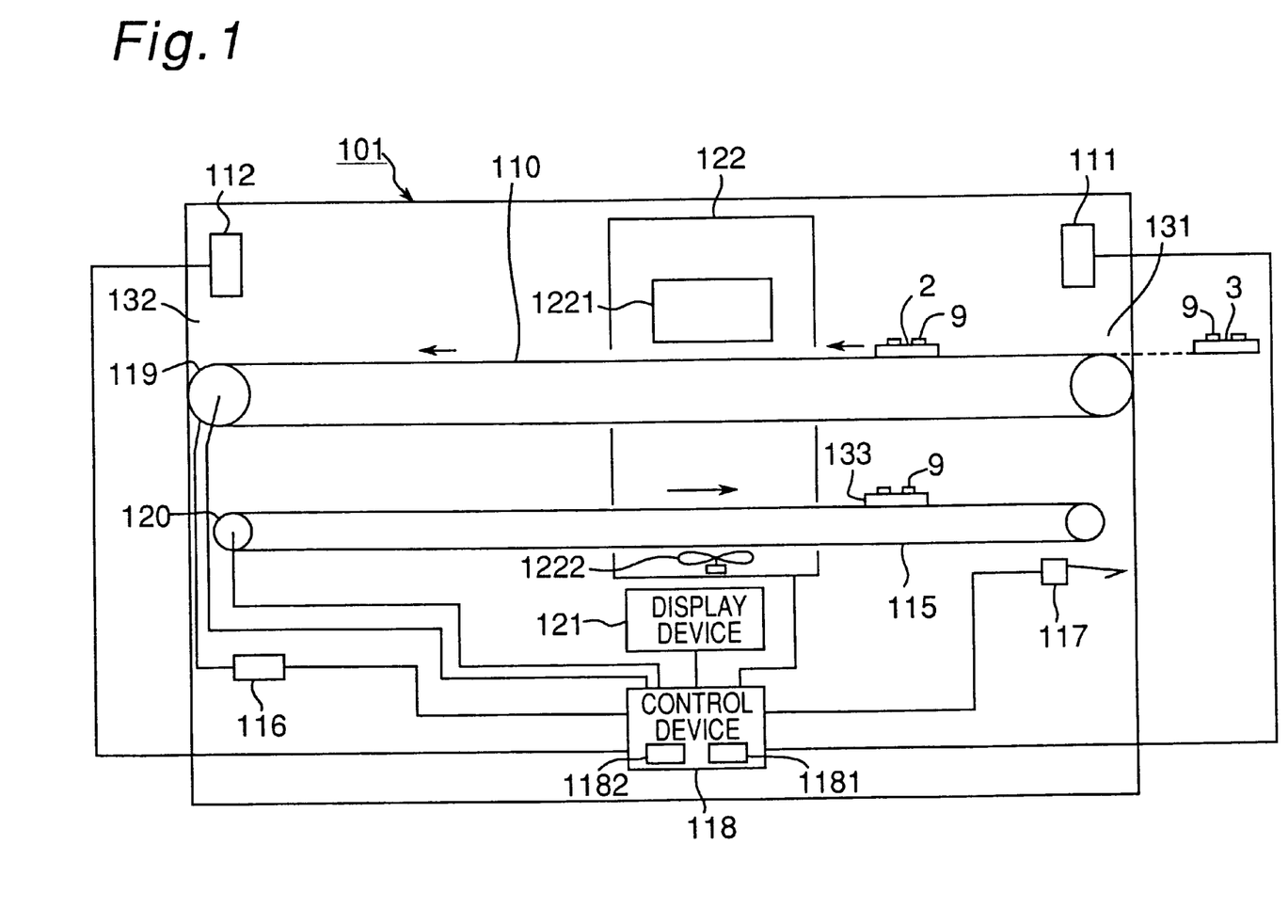
FIG. 1 is a diagram schematically showing the constitution of a reflow soldering apparatus according to a first embodiment of the present invention.

FIG. 1 shows the total constitution of a reflow soldering apparatus 101 according to a first embodiment. The reflow soldering apparatus 101 includes a transfer conveyor 110, an exit-side circuit board detect sensor 112, a circuit board discharge conveyor 115, a circuit board discharge completion detect sensor 117, a control device 118, and a heating furnace 122. The reflow soldering apparatus further has an entrance-side circuit board detect sensor 111, a speed detector 116 for the transfer conveyor, a driving source 119 for the transfer conveyor, a driving source 120 for the circuit board discharge conveyor, and a display device 121.

Figure 11:
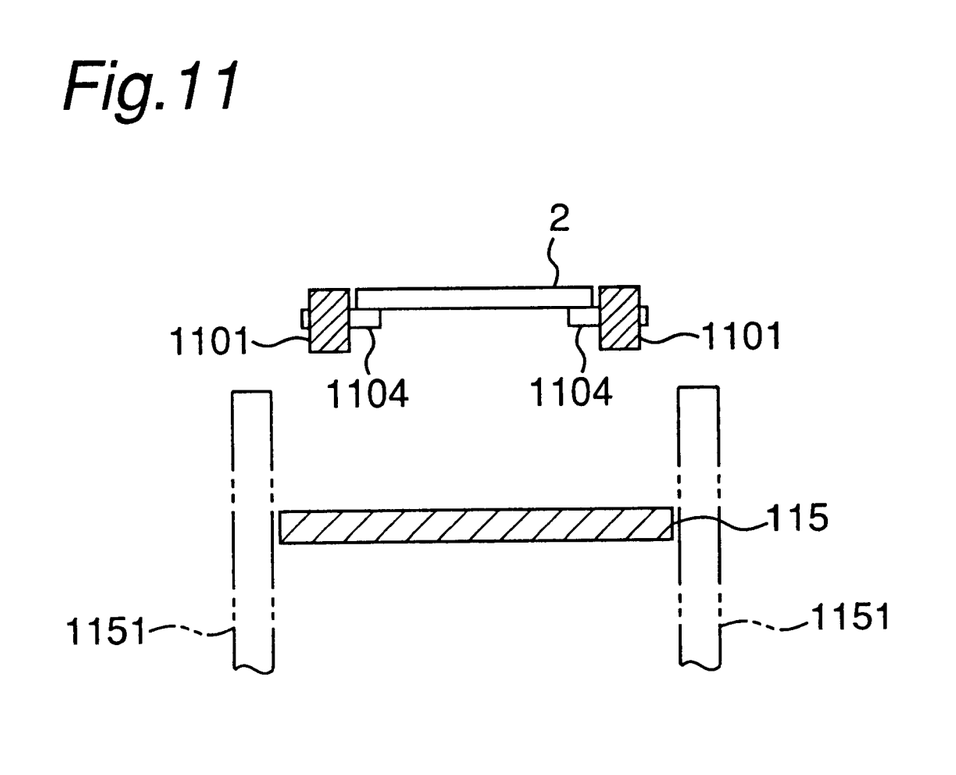
FIG. 11 is a diagram of an arrangement relationship in a thicknesswise direction of the circuit board between a transfer conveyor and a discharge conveyor in each embodiment of the present invention.
Figure 13:
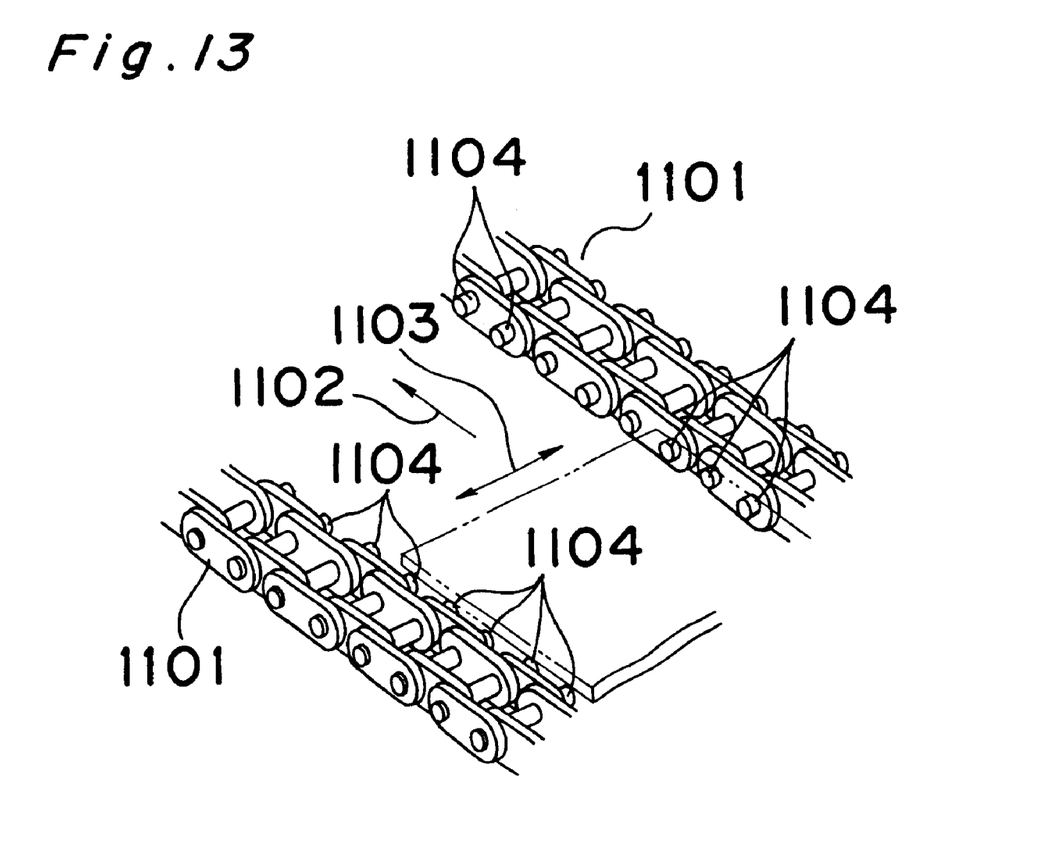
FIG. 13 is a perspective view of a transfer conveyor provided in each embodiment of the present invention.

The transfer conveyor 110 transfers a circuit board 2 with electronic components 9 mounted thereto from an apparatus entrance 131 of the reflow soldering apparatus 101 to an apparatus exit 132. The transfer is carried out by the driving source 119 of a motor in the embodiment. As shown in FIG. 13, the transfer conveyor 110 is a chain conveyor with a pair of chains 1101. Each chain 1101 has supporting pins 1104 set projecting slightly in a breadthwise direction 1103 of the circuit board 2 which is orthogonal to a transfer direction 1102 for the circuit board 2. The circuit board 2 is placed on the supporting pins 1104, thereby being supported at both end parts thereof by the supporting pins 1104 as indicated in FIG. 11. The circuit board is transferred as the chains 1101 move in the transfer direction 1102. At least one of the chains 1101 is moveable in the breadthwise direction 1103 to meet a breadth of the circuit board 2, so that various circuit boards 2 can be transferred.

The speed detector 116 is set to the driving source 119, and a signal related to a transfer speed of the transfer conveyor 110 detected by the speed detector 116 is supplied to the control device 118 which controls the driving source 119 with a feed-back control.

The entrance-side circuit board detect sensor 111 is constituted of a reflecting type photoelectric sensor in the present embodiment, and arranged at the apparatus entrance 131 for detecting when the circuit board 2 is carried into the reflow soldering apparatus 101. The entrance-side circuit board detect sensor 111 is used in the embodiment also for measuring a length of the circuit board along the transfer direction of the carried circuit board 2.

The exit-side circuit board detect sensor 112 is constituted of a reflecting type photoelectric sensor in the embodiment, which is arranged at the apparatus exit 132 to detect when the circuit board 2 is carried out of the reflow soldering apparatus 101. The entrance-side circuit board detect sensor 111 and the exit-side circuit board detect sensor 112 send detect signals to the control device 118.

In the halfway of a transfer path of the transfer conveyor 110 is installed the heating furnace 122 for heating both the circuit board 2 with electronic components 9 and the electronic components 9, melting solder thereby soldering the electronic components 9 on the circuit board 2. The heating furnace 122 is provided with a heater 1221 for heating and a fan 1222 for circulating gas heated with the heater 1221 within the heating furnace 122 as indicated in FIG. 1.

The transfer conveyor 110 supports the circuit board 2 by the supporting pins 1104 projecting in the breadthwise direction 1103 as mentioned before. Also, a contact area of each side on the circuit board 2 which comes into contact with the supporting pins 1104 should be an area not forming conductor traces on the circuit board 2, and should be as narrow as possible because of high-packaging density of the circuit board. Therefore a standard circuit board has a 3 mm-width in each contact area in the breadthwise direction 1103 and even a nonstandard circuit board has a 4-5 mm-width. Further since the transfer conveyor 110 is, for example, a several meters long, each chain 1101 of the transfer conveyor 110 is unfavorably moved about 1 mm in the breadthwise direction 1103. Further the circuit board 2 becomes deformed in various shapes, for example, in warpage, twisting or the like due to heat of the reflow operation. Under the above circumstances, even if a gap between the chain 1101 and each side face of the circuit board 2 is set to be in about 0.5 mm in the breadthwise direction 1103, when the transfer conveyor 110 is expanded in breadth by heat of the reflow operation, the circuit board 2 supported by the transfer conveyor 110 might drop from the transfer conveyor 110.

Thus, as shown in FIG. 11, the circuit board discharge conveyor 115 is arranged directly below the transfer conveyor 110 in a vertical direction along with the transfer conveyor 110. The circuit board discharge conveyor 115 is formed in a belt-type conveyor receiving a dropped circuit board 133 dropped from the transfer conveyor 110 during the transfer by the transfer conveyor 110, and discharges the dropped circuit board 133 outside of the reflow soldering apparatus 101. In the embodiment, the driving source 120 for the circuit board discharge conveyor 115 which is a motor is controlled by the control device 118 to operate to transfer the dropped circuit board 133. The circuit board discharge conveyor 115 has a breadth not smaller than a breadth of the transfer conveyor 110 as is clear from FIG. 11. Although the circuit board discharge conveyor 115 extends over an entire length of the transfer conveyor 110 according to the embodiment, the circuit board discharge conveyor 115 may be omitted at a place where the circuit board 2 never drops at all. Since the transfer conveyor 110 has its size changeable in the breadthwise direction 1103 as described before, the breadth of the circuit board discharge conveyor 115 is designed to exceed a maximum changed breadth of the transfer conveyor 110. As illustrated in FIG. 11, a drop prevent wall 1151 may be arranged at each side of the transfer discharge conveyor 115 to prevent the dropped circuit board 133 dropped on the circuit board discharge conveyor 115 from dropping further out of the transfer discharge conveyor 115.

The circuit board discharge completion detect sensor 117 consists of a limit switch in the embodiment. The sensor detects whether or not the dropped circuit board 133 is discharged out of the apparatus by the circuit board discharge conveyor 115 and sends a detect signal to the control device 118.

The display device 121 is a device for visibly displaying a kind of an abnormality when the circuit board 2 is transferred abnormally by the transfer conveyor 110.

In the first embodiment, the control device 118 is provided with a memory part 1181 and a monitor part 1182. The memory part 1181 stores a transfer estimate time which is a period after the entrance-side circuit board detect sensor 111 completes to detect the circuit board 2 before the exit-side circuit board detect sensor 112 starts to detect the circuit board 2 transferred by the transfer conveyor 110. The monitor part 1182 measures an actual transfer time actually required from the above detect completion to the detect start.

The operation of the reflow soldering apparatus 101 in the first embodiment constituted as above will be described below. The operation depicted below is controlled by the control device 118. The soldering operation by the heating furnace 122 is not different from that executed by a heating furnace of the conventional reflow soldering apparatus and therefore, the soldering operation will not be discussed in each description of the first through a third embodiments hereinbelow.

Figure 2:
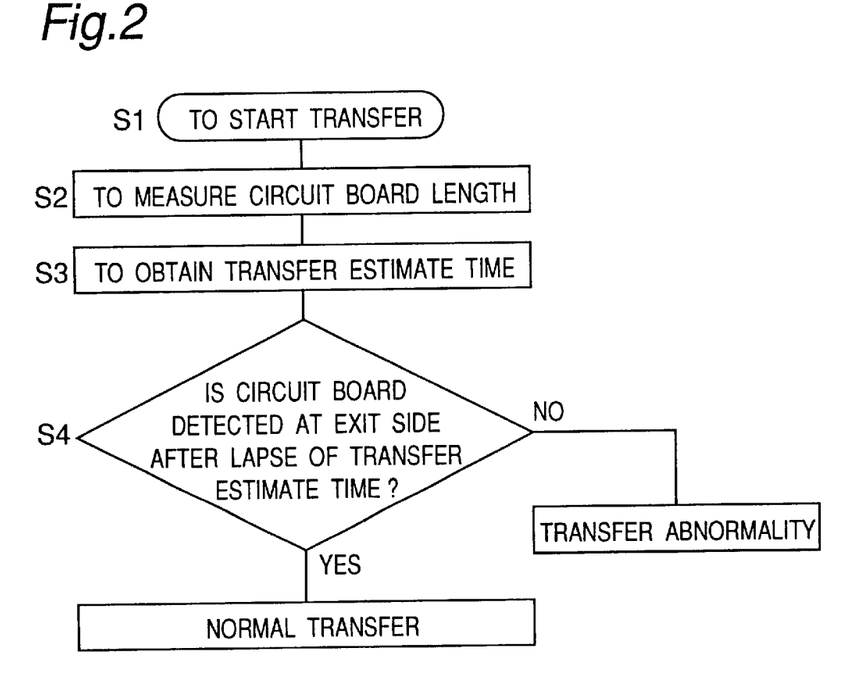
FIG. 2 is a flow chart of an operation for detecting the presence or absence of transfer abnormality by the reflow soldering apparatus shown in FIG. 1.

In step (designated in the drawing by "S") 1 in FIG. 2, the driving source 119 for the transfer conveyor drives the transfer conveyor 110 in response to a command from the control device 118. A speed of the transfer conveyor 110 is calculated through the speed detector 116 by the control device 118 and set to a predetermined value.

Figure 3A:
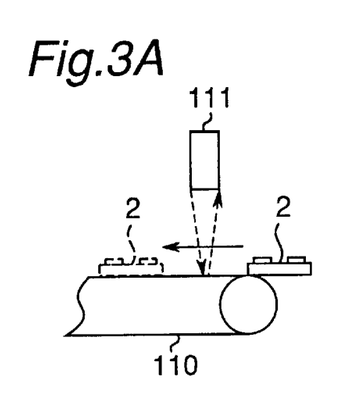
FIG. 3A is a diagram explanatory of a circuit board length measurement operation in FIG. 2.
Figure 3B:
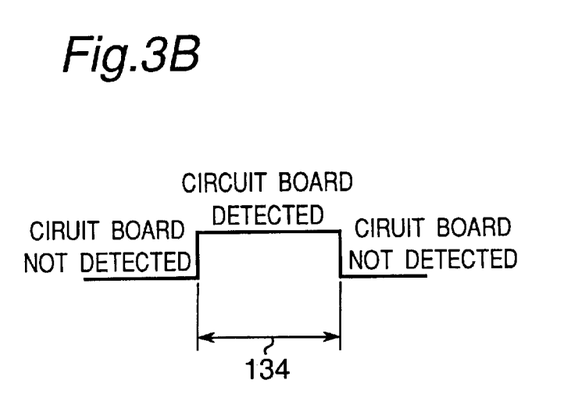
FIG. 3B is a diagram showing a change in output signal of an entrance-side circuit board detect sensor because of the circuit board length measurement operation.

When the entrance-side circuit board detect sensor 111 detects the circuit board 2 carried in from the apparatus entrance 131, in step 2, the control device 118 measures a circuit board detect time 134 while the entrance-side circuit board detect sensor 111 is detecting the circuit board 2 subsequent to the transfer by the transfer conveyor 110 as shown in FIG. 3A, and obtains a circuit board length in the transfer direction of the circuit board 2 from the circuit board detect time 134. In other words, since the control device 118 recognizes the speed of the transfer conveyor 111 beforehand, the control device obtains the circuit board length of the circuit board 2 on the basis of the circuit board detect time 134 as is understood from FIG. 3B.

In step 3, the control device 118 obtains the transfer estimate time based on the obtained circuit board length of the circuit board 2, the preliminarily recognized transfer speed of the transfer conveyor 110, and a preliminarily detected distance between the entrance-side circuit board detect sensor 111 and the exit-side circuit board detect sensor 112. More specifically, the control device 118 subtracts the circuit board length of the circuit board 2 from the distance between the sensors 111 and 112, thereby obtaining a transfer distance, and divides the transfer distance by the transfer speed of the transfer conveyor 110, whereby the transfer estimate time is obtained. Since a plurality of circuit boards are generally carried into the reflow soldering apparatus 101 in a single line, each of the transfer estimate times is obtained in the same way for each of the carried circuit boards. The obtained transfer estimate times are stored separately for each circuit board to be monitored into the memory part 1181 of the control device 118. The transfer estimate time can be obtained with taking a slip, a hitch or the like of the circuit board 2 in the middle of the transfer into account. The calculated values are stored in the memory part 1181 as empirical correction data. An accuracy of the transfer estimate time can be improved more by using the correction data. Since a memory capacity of the memory part 1181 is limited, as to the monitored circuit board 2 passing through the entrance-side circuit board detect sensor 111 and exceeding the transfer estimate time, the control device 118 eliminates data of the transfer estimate time of the monitored circuit board 2 after the monitored circuit board 2 is judged as to whether it is transferred normally or abnormally. Thus a memory area for a fresh circuit board 2 to be monitored is secured.

In next step 4, the control device 118 monitors a past time that elapses since the entrance-side circuit board detect sensor 111 finishes detecting the circuit board 2 and monitors whether or not the exit-side circuit board detect sensor 112 detects the monitored circuit board 2 within the circuit board detect time 134 corresponding to the circuit board length after the monitored past time exceeds the transfer estimate time. That is, the circuit board detect time 134 serves as an allowance time for the exit-side circuit board detect sensor 112 to detect the circuit board 2. The circuit board detect time 134 is a time corresponding to the circuit board length of one circuit board 2 by way of example. In the first embodiment as described above, the circuit board detect time 134 is added immediately after a time point when the transfer estimate time has passed. However, as the allowance time, for example half the circuit board detect time 134 may be provided before and after the time point when the transfer estimate time is completed respectively. How to arrange and distribute the circuit board detect time 134, namely, the allowance time to the time point when the transfer estimate time is complete can be set on a case-by-case basis. In addition, the allowance time is not limited to the circuit board detect time 134 although the circuit board detect time 134 is utilized in the embodiment.

In step 4, when the exit-side circuit board detect sensor 112 detects the circuit board 2 within the allowance time, the control device 118 judges that the circuit board 2 is transferred normally by the transfer conveyor 110. On the other hand, unless the exit-side circuit board detect sensor 112 detects the circuit board 2, the control device judges that the transfer of the circuit board 2 is abnormal.

Figure 4:
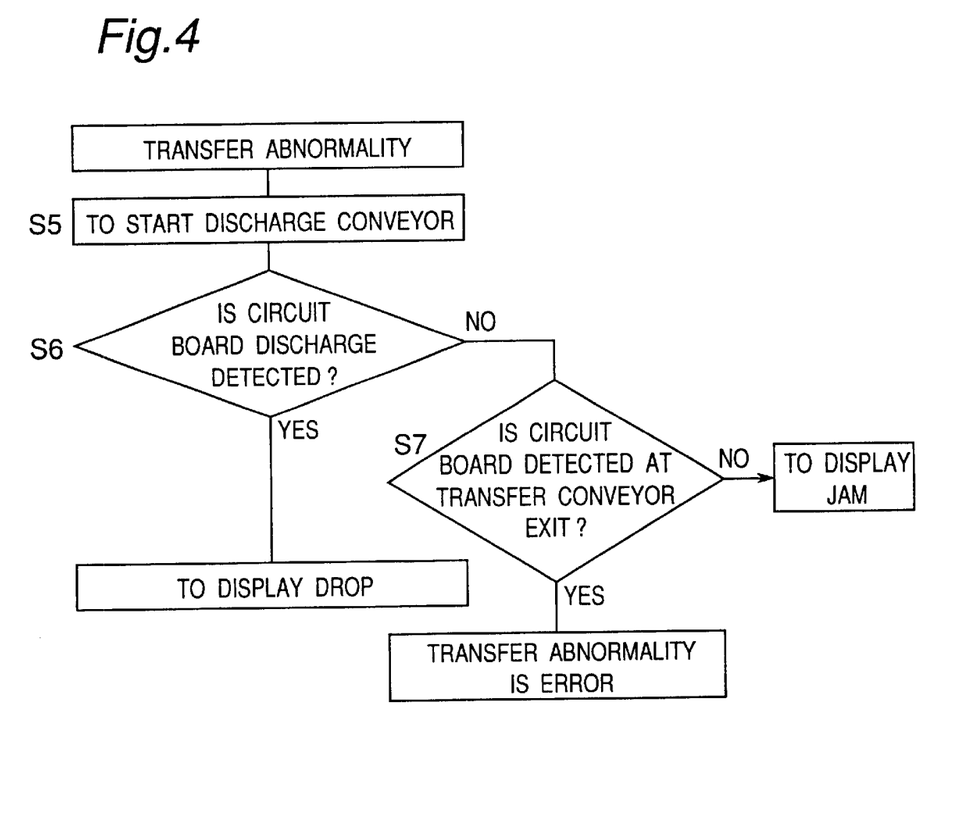
FIG. 4 is a flow chart of an operation for processing the transfer abnormality in each embodiment of the present invention.

The operation when the transfer is judged as abnormal in step 4 will be depicted with reference to FIG. 4.

The control device 118 starts the circuit board discharge conveyor 115 via the driving source 120 for the circuit board discharge conveyor in step 5. A time while the circuit board discharge conveyor 115 operates is set so that the dropped circuit board 133 can be discharged outside of the reflow soldering apparatus 101 even if the circuit board 2 drops somewhere during the transfer by the transfer conveyor 110. In the present embodiment, the circuit board discharge conveyor 115 is started in step 5 when the transfer is judged as abnormal in step 4. The circuit board discharge conveyor 115 operates only for a necessary time as above, and therefore energy can be saved. However, the present invention is not restricted to this arrangement and the circuit board discharge conveyor 115 may be maintained in an operating state irrespective of presence or absence of the transfer abnormality in step 4.

In step 6, when the circuit board discharge completion detect sensor 117 detects the dropped circuit board 133 while the circuit board discharge conveyor 115 is operating, the control device 118 judges that the transfer abnormality is a drop of the circuit board 2, displaying to the display device 121 that the drop takes place. On the other hand, if the circuit board discharge completion detect sensor 117 does not detect the dropped circuit board 133 in step 6, the control device 118 judges in step 7 whether or not the exit-side circuit board detect sensor 112 detects a circuit board 3 carried into the reflow soldering apparatus 101 next to the circuit board 2. When the exit-side circuit board detect sensor 112 does not detect the circuit board 3, the control device 118 judges that the above transfer abnormality is a jam and makes the display device 121 display generation of the jam. In addition, the control device 118 lowers a temperature of the heating furnace 122 or stops the heating of the heating furnace 122. To the contrary, when the circuit board discharge completion detect sensor 117 does not detect the dropped circuit board 133 during the operation of the circuit board discharge conveyor 115 and the exit-side circuit board detect sensor 112 detects the circuit board 3, the control device 118 judges that the transfer abnormality is a wrong judgment, without displaying to the display device 121.

When a transfer state is monitored with use of the transfer estimate time as above, the transfer abnormality of the circuit board 2 can be detected regardless of a thickness of the circuit board 2.

Effects as follows are also exerted if it is judged on the basis of the measured circuit board length of the circuit board 2 whether or not the circuit board is transferred normally by the transfer conveyor 110. Specifically, a time between when the circuit board completely enters the apparatus entrance 131 and when a leading end of the circuit board 2 reaches the apparatus exit 132 can be calculated by measuring the circuit board length. As a result, influences caused by a feed conveyor arranged at the entrance of the reflow soldering apparatus 101 and pushing the circuit board 2 into the reflow soldering apparatus 101, and caused by a take-out conveyor arranged at the exit of the reflow soldering apparatus 101 and pulling the circuit board 2 outside from the apparatus 101 are eliminated. Also for instance, a necessity for monitoring and occurrence of malfunctions or the like can be eliminated.

Furthermore, in the case where a relationship between the circuit board length of the circuit board 2 and a temperature required for operating the reflow soldering to the circuit board 2 is already known, temperatures of preheating and actual heating carried out by the reflow soldering apparatus 101 may be changed with use of the information on the circuit board length.

By adopting the constitution of the first embodiment, whether the transfer abnormality is a jam or a drop of the circuit board 2 in the middle of the transfer by the transfer conveyor 110 can be judged.

Since the memory part 1181 stores the transfer estimate time for every individual circuit board 2 carried into the reflow soldering apparatus 101, the presence or absence of the transfer abnormality can be judged for each circuit board 2.

Moreover, since the entrance-side circuit board detect sensor 111 not only detects whether the circuit board is carried in or not, but measures the circuit board length, a parts count is reduced and costs can be lowered.

According to the first embodiment, the transfer estimate time is set to be the time between when the circuit board 2 passes the entrance-side circuit board detect sensor 111 and when the circuit board 2 reaches the exit-side circuit board detect sensor 112. However, the transfer estimate time can be a time which elapses between when the circuit board 2 is detected by the entrance-side circuit board detect sensor 111 and when it is detected by the exit-side circuit board detect sensor 112, or a time which elapses between when the circuit board 2 is detected by the entrance-side circuit board detect sensor 111 and when the circuit board 2 passes the exit-side circuit board detect sensor 112 at the exit time.

Second Embodiment

Figure 5:
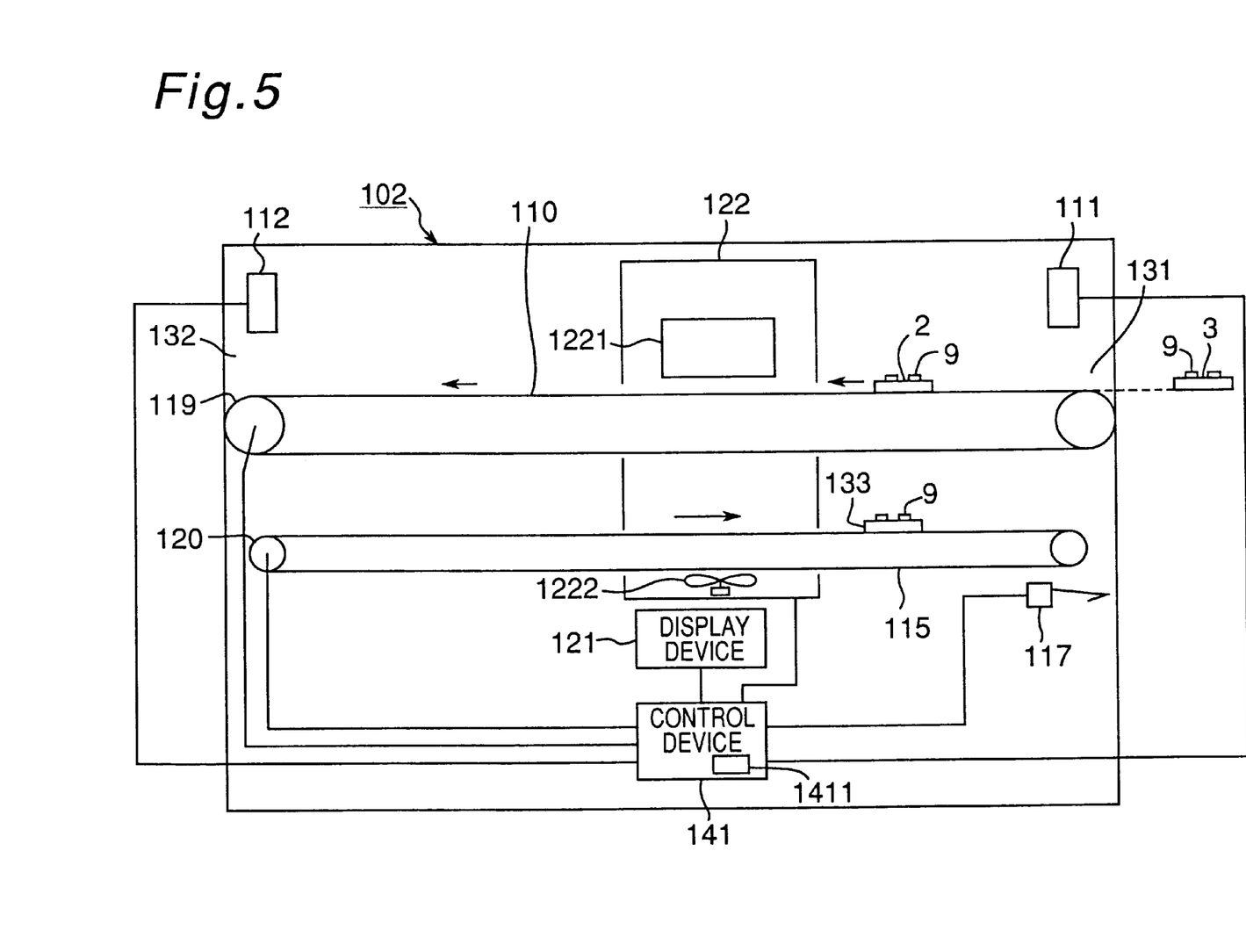
FIG. 5 is a diagram schematically showing the constitution of a reflow soldering apparatus according to a second embodiment of the present invention.

FIG. 5 shows a reflow soldering apparatus 102 according to a second embodiment, in which the same parts as in the reflow soldering apparatus 101 of the above first embodiment are designated by the same reference numerals. In comparison with the reflow soldering apparatus 101 in the first embodiment, the reflow soldering apparatus 102 of the instant embodiment is not equipped with the speed detector 116 for the transfer conveyor and the control device 118 is changed to a control device 141. The control device 141 includes a memory part 1411, but does not have the monitor part 1182. The reflow soldering apparatus 102 is not changed in any other constitution.

The reflow soldering apparatus 102 operates in a manner as will be described hereinbelow.

Figure 6A:
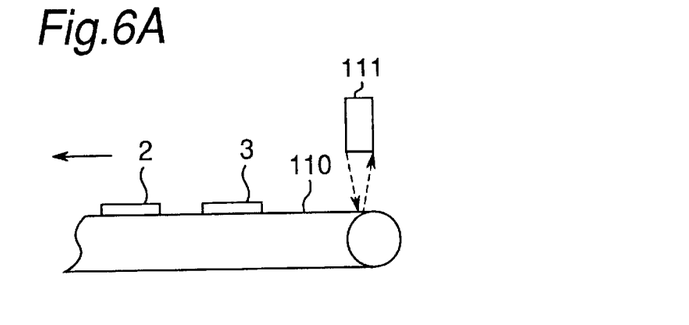
FIG. 6A is a diagram explanatory of an operation for measuring a circuit board carry-in interval in the reflow soldering apparatus of FIG. 5.
Figure 6B:
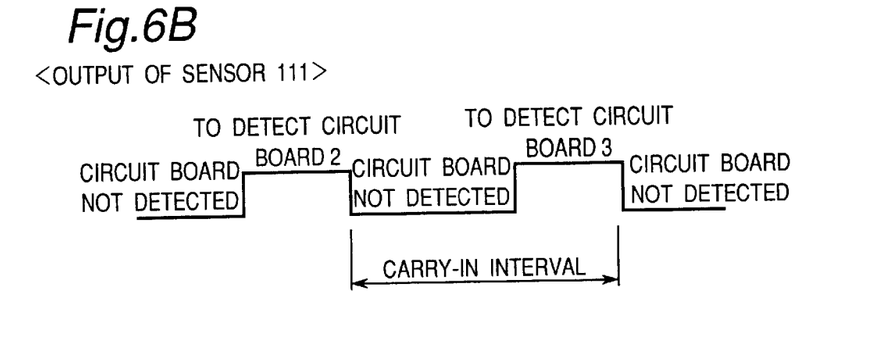
FIG. 6B is a diagram showing a change in output signal of the entrance-side circuit board detect sensor because of the measurement operation for the circuit board carry-in interval.

The driving source 119 for the transfer conveyor drives the transfer conveyor 110 in accordance with a command from the control device 141. Subsequent to the driving, in step 11 in FIG. 7, the control device 141 measures a time, as indicated in FIGS. 6A and 6A, which elapses between when the circuit board 2 passes the entrance-side circuit board detect sensor 111 and when the next circuit board 3 to the circuit board 2 passes the entrance-side circuit board detect sensor 111. The time is stored as a carry-in interval into the memory part 1411. When three or more circuit boards are sequentially carried in, each carry-in interval of circuit boards is sequentially measured and stored in the memory part 1411.

Figure 7:
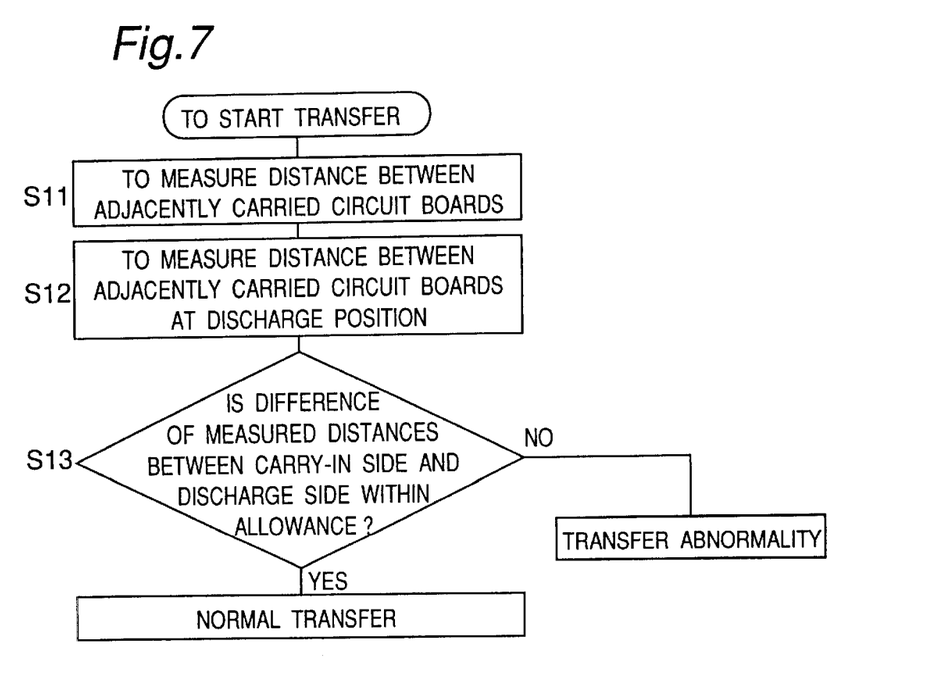
FIG. 7 is a flow chart of an operation for detecting the presence or absence of transfer abnormality by the reflow soldering apparatus shown in FIG. 5.

In next step 12, a time which elapses between when the exit-side circuit board detect sensor 112 detects an object to be detected, i.e. the circuit board 2, transferred by the transfer conveyor 110 and when the exit-side circuit board detect sensor 112 detects the next transferred circuit board 3 is measured, and then the measured time is set as a discharge interval. In the case where three or more circuit boards are sequentially carried in as mentioned above, each discharge interval of circuit boards is sequentially measured and stored in the memory part 1411.

In step 13, the control device 141 compares the carry-in interval and the discharge interval, and judges that the circuit boards 2 and 3 are normally transferred when the comparison result is within an allowable range. The allowable range can be determined with a slip or a snag of the circuit boards in the middle of the transfer taken into account. The thus-set allowable range of empirical values is stored as correction data in the memory part 1411. An accuracy of the comparison result between the carry-in interval and the discharge interval can be improved more by using the correction data. The allowable range is, e.g., a length corresponding to the circuit board length of one circuit board 2. By contrast, the control device 141 judges that the transfer by the transfer conveyor 110 is abnormal when the comparison result is not in the allowable range.

In the case of three or more circuit boards transferred, each carry-in interval and discharge interval are compared, whereby the presence or absence of the transfer abnormality is judged for each case.

The operation described with reference to FIG. 4 is executed when the transfer abnormality is brought about. Since the two circuit boards 2 and 3 transferred adjacently are objects to be detected in the second embodiment, the control device 141 judges in step 6 that the transfer abnormality is caused by the "drop" when the circuit board 2 or 3 is detected. On the other hand, the control device 141 judges in step 7 that the transfer abnormality results from the "jam" when the exit-side circuit board detect sensor 112 detects neither the circuit board 2 nor the circuit board 3.

As above, a transfer state is monitored with use of the interval between the circuit boards. Thus the transfer abnormality of the circuit board 2, or both circuit boards 2 and 3 can be detected irrespective of a thickness of the circuit board 2, or irrespective of thicknesses of the circuit boards 2 and 3. Similar to the first embodiment, the second embodiment enables to judge whether the transfer abnormality is caused by the jam, in other words clog, or by the drop of the circuit board 2 in the middle of the transfer by the transfer conveyor 110. Effectively the judgment is not influenced by a speed of the transfer conveyor 110.

The memory part 1411 stores the carry-in interval and the discharge interval for each circuit board 2, so that the presence or absence of the transfer abnormality can be judged for each circuit board 2.

Furthermore, the entrance-side circuit board detect sensor 111 not only detects whether or not the circuit board is carried in, but measures the interval of the carried circuit boards, while the exit-side circuit board detect sensor 112 not only detects whether or not the circuit board is discharged, but measures the interval of the carried-out circuit boards. This arrangement can reduce the number of parts and cost.

The above description is related to a case where the interval of two circuit boards 2 and 3 transferred adjacently is smaller than a distance between the entrance-side circuit board detect sensor 111 and the exit-side circuit board detect sensor 112. If the interval of a circuit board supplied to the transfer conveyor 110 is longer than the distance of the sensors, that is, if the number of the circuit board present in the reflow soldering apparatus 102 is one, an embodiment of the present invention is so constituted that the control device 141 judges occurrence of the transfer abnormality unless the exit-side circuit board detect sensor 112 detects the circuit board 2 within a fixed time after the circuit board 2 has passed the entrance-side circuit board detect sensor 111.

The aforementioned fixed time is a time necessary for the circuit board 2 to reach the exit-side circuit board detect sensor 112 after having passed the entrance-side circuit board detect sensor 111. At the occurrence of the transfer abnormality, if the circuit board discharge completion detect sensor 117 detects the circuit board 2 while the circuit board discharge conveyor 115 is driving, the control device 141 judges that the transfer abnormality is the "drop" and displays to the display device 121 that the circuit board drops. On the other hand, if the circuit board discharge completion detect sensor 117 does not detect the circuit board 2 while the circuit board discharge conveyor 115 is driving, the control device 141 judges that the transfer abnormality is the "clog" in other words "jam", with displaying occurrence of the clog to the display device 121. At the same time, the control device decreases a temperature of the heating furnace 122 or stops the heating furnace.

According to the second embodiment, the carry-in interval is the time which elapses between when the circuit board 2 passes the entrance-side circuit board detect sensor 111 and when the circuit board 3 passes the entrance-side circuit board detect sensor 111 as described above. However, the interval may be a time which elapses between when the entrance-side circuit board detect sensor 111 detects the circuit board 2 and when the entrance-side circuit board detect sensor 111 detects the circuit board 3.

Third Embodiment

Figure 8:
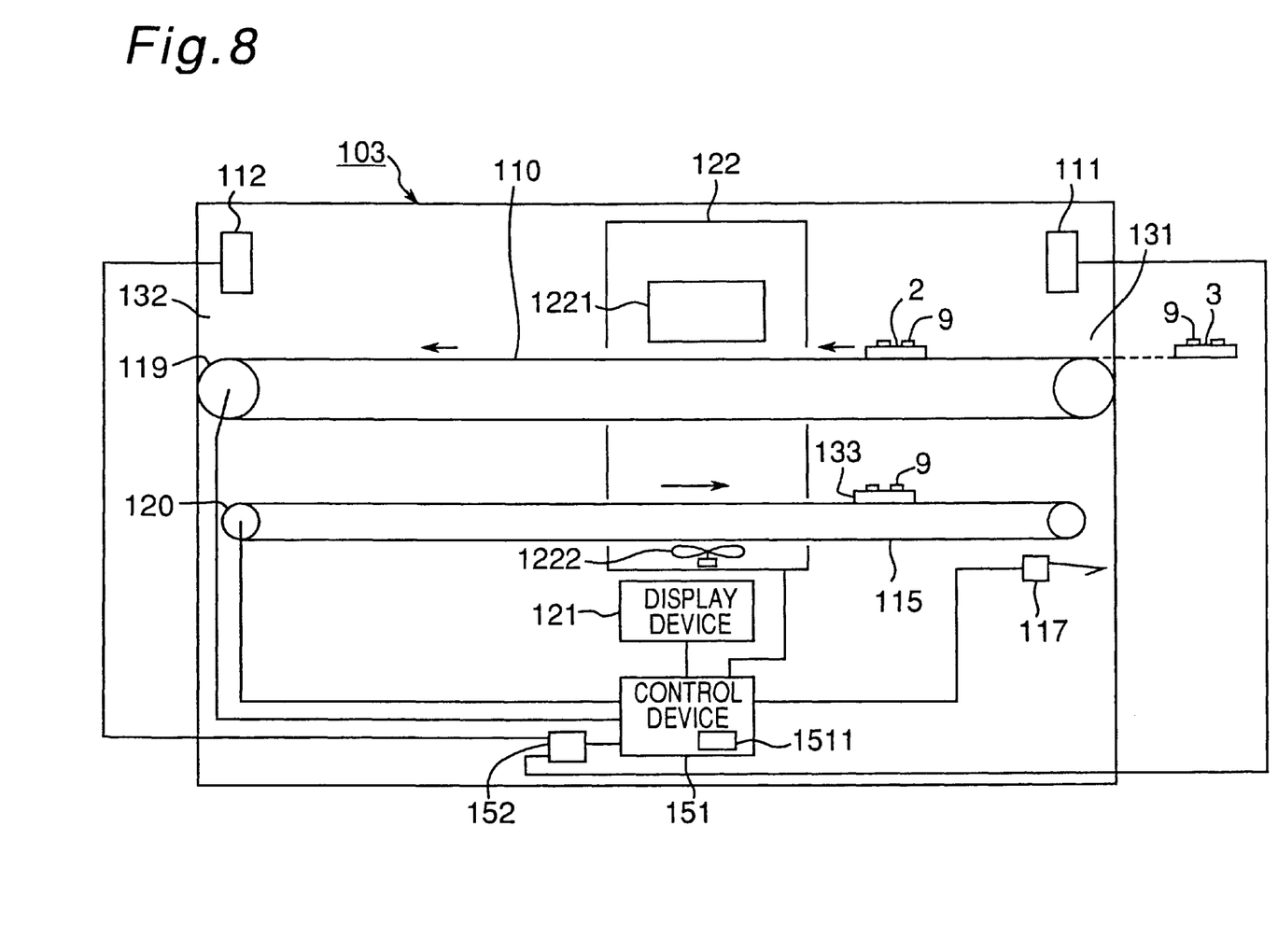
FIG. 8 is a diagram schematically showing the constitution of a reflow soldering apparatus according to a third embodiment of the present invention.

FIG. 8 shows a reflow soldering apparatus 103 according to a third embodiment of the present invention, wherein the same parts are designated by the same reference numerals as in the reflow soldering apparatus 101 in the first embodiment. The reflow soldering apparatus 103 in the third embodiment does not have the speed detector 116 for the transfer conveyor, unlike the reflow soldering apparatus 101 of the first embodiment. Instead, a counter device 152 is installed which increments a count value by one in accordance with a signal from the entrance-side circuit board detect sensor 111 every time the circuit board is carried to the apparatus entrance 131, and decrements the count value by one based on a signal from the exit-side circuit board detect sensor 112 every time the circuit board is discharged to the apparatus exit 132. The control device 118 is changed to a control device 151 which has a memory part 1511 and does not have a monitor part 1182. The third embodiment is not different in other points of the constitution.

The operation of the reflow soldering apparatus 103 will be depicted below.

The driving source 119 for the transfer conveyor drives the transfer conveyor 110 in compliance with a command from the control device 151.

Figure 9:
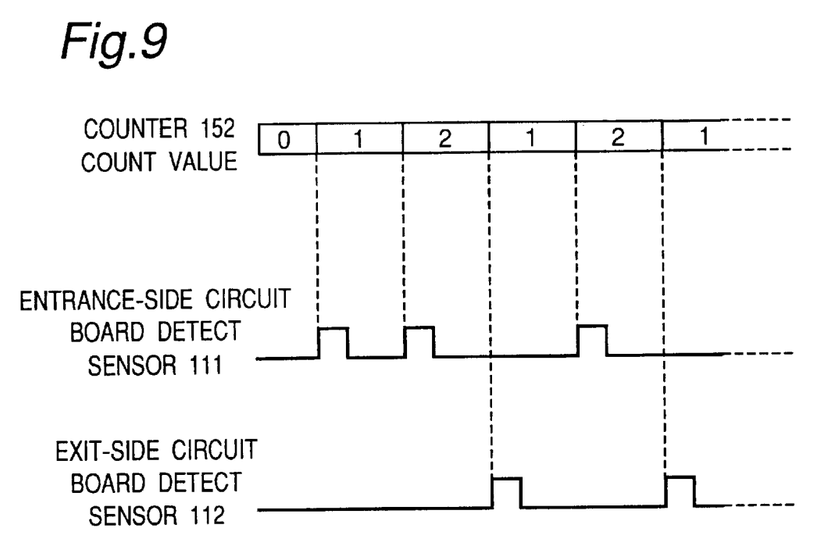
FIG. 9 is a diagram explanatory of an operation for counting the number of circuit boards in the reflow soldering apparatus shown in FIG. 8.
Figure 10:
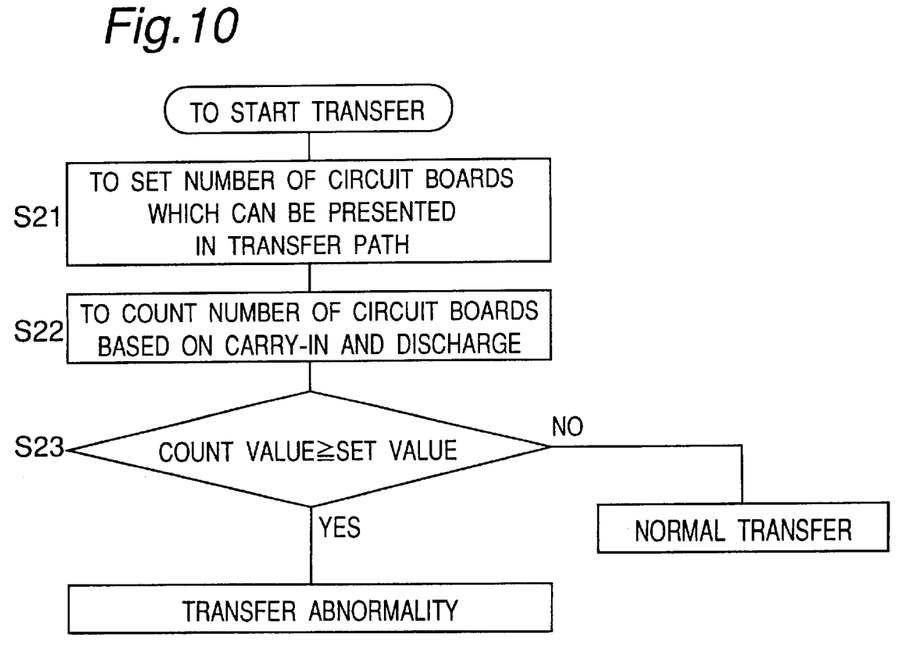
FIG. 10 is a flow chart of an operation for detecting the presence or absence of transfer abnormality by the reflow soldering apparatus shown in FIG. 8.

In step 21 of FIG. 10, the number of circuit boards 2 that can be present between the circuit board detect sensors 111 and 112 is set as a circuit board count set value to the counter device 152. In step 22, as shown in FIG. 9, one is added to the count value of the counter device 152 when the entrance-side circuit board detect sensor 111 detects the circuit board 2, and one is subtracted from the count value when the exit-side circuit board detect sensor 112 detects the circuit board 2. In step 23, the count value of the counter device 152 after the transfer conveyor 110 starts transferring the circuit boards 2 is compared with the circuit board count set value set to the counter device 152 in step 21. When the count value of the counter device 152 is not smaller than the set value, the control device 151 judges that the circuit board transfer by the transfer conveyor 110 is abnormal, with displaying occurrence of the abnormality to the display device 121. If the count value of the counter device 152 is smaller than the set value, the control device 151 judges that the transfer conveyor 110 normally transfers the circuit boards 2.

In the case where the transfer abnormality is judged by the control device 151, the operation described with reference to FIG. 4 is executed similar to the first and second embodiments.

The number of circuit boards transferred is used as a judgment element for the transfer abnormality as above, so that the abnormality during the transfer can be detected.

Since the transfer state is monitored with use of information on the number of circuit boards, the transfer abnormality of the circuit board 2 can be detected irrespective of the thickness of the circuit board 2 in the same way as in the first and second embodiments described earlier. Moreover, whether the transfer abnormality results from the clog or the drop of the circuit board 2 in the middle of the transfer by the transfer conveyor 110 can be judged as well.

Although the counter device 152 has a comparing and operating function in the above description, the comparison and operation may be carried out by the control device 151.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A reflow soldering method comprising:
    judging whether or not a circuit board with electronic components mounted thereon is transferred by a transfer conveyor from an entrance to an exit of a reflow soldering apparatus with a heating furnace for operating reflow soldering to the electronic components on the circuit board by passing the circuit board through the heating furnace;
    detecting, when presence of transfer abnormality is judged, whether or not a dropped circuit board dropped from the transfer conveyor while being transferred by the transfer conveyor is discharged to an outside of the apparatus by a discharge conveyor arranged below the transfer conveyor;
    determining, when the dropped circuit board is detected to be discharged by the discharge conveyor, that the transfer abnormality is the drop of the circuit board; and
    continuing the operation of the reflow soldering.

2. The reflow soldering method according to claim 1, wherein, when a plurality of circuit boards are carried to the entrance in a single line, in the determination of the transfer abnormality, the transfer abnormality is determined as a jam of the circuit boards at the transfer conveyor and a temperature of the heating furnace is lowered unless the dropped circuit board is detected to be discharged and also unless the circuit board is detected to be discharged by the transfer conveyor at the exit.

3. The reflow soldering method according to claim 1, wherein in the judgement of the circuit board transfer, the presence or absence of the transfer abnormality is judged on a basis of whether or not the discharge of the circuit board is detected within a circuit board detect time after a transfer estimate time has passed; the circuit board detect time corresponding to a passing time of the circuit board in a transfer direction of the circuit board, and the transfer estimate time being a time required for the circuit board to be transferred from the entrance to the exit.

4. The reflow soldering method according to claim 2, wherein in the judgement of the circuit board transfer, the presence or absence of the transfer abnormality is judged on a basis of whether or not the discharge of the circuit board is detected within a circuit board detect time after a transfer estimate time has passed; the circuit board detect time corresponding to a passing time of the circuit board in a transfer direction of the circuit board, and the transfer estimate time being a time required for the circuit board to be transferred from the entrance to the exit.

5. The reflow soldering method according to claim 1, wherein, when a plurality of circuit boards are carried to the entrance in a single line, in the judgement of the circuit board transfer, the presence or absence of the transfer abnormality is judged on a basis of a comparison between a carry-in interval of circuit boards carried adjacently to the entrance and a discharge interval of the adjacent circuit boards discharged from the exit.

6. The reflow soldering method according to claim 2, wherein, when a plurality of circuit boards are carried to the entrance in a single line, in the judgement of the circuit board transfer, the presence or absence of the transfer abnormality is judged on a basis of a comparison between a carry-in interval of circuit boards carried adjacently to the entrance and a discharge interval of the adjacent circuit boards discharged from the exit.

7. The reflow soldering method according to claim 1, wherein in the judgement of the circuit board transfer, the presence or absence of the transfer abnormality is judged on a basis of a comparison between a circuit board count set value and a count value, the circuit board count set value corresponding to the number of circuit boards which can be presented on the transfer conveyor between the entrance and the exit, and the count value corresponding to the number of circuit boards actually present on the transfer conveyor between the entrance and the exit.

8. The reflow soldering method according to claim 2, wherein in the judgement of the circuit board transfer, the presence or absence of the transfer abnormality is judged on a basis of a comparison between a circuit board count set value and a count value, the circuit board count set value corresponding to the number of circuit boards which can be presented on the transfer conveyor between the entrance and the exit, and the count value corresponding to the number of circuit boards actually present on the transfer conveyor between the entrance and the exit.

* * * * *